June 16, 1953  N. A. PALMGREN  2,642,322
ROLLER BEARING
Filed June 30, 1949
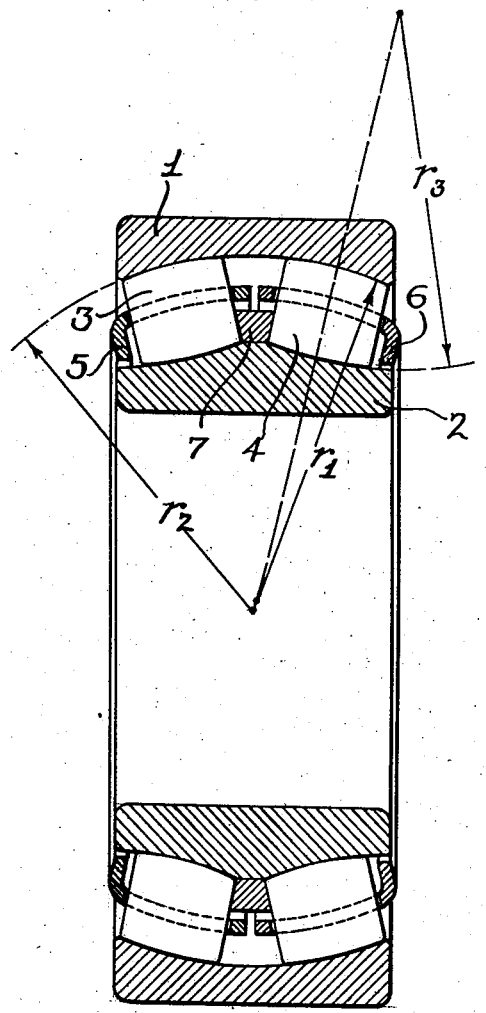
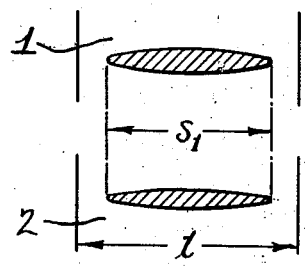
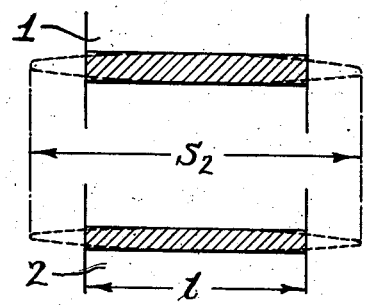
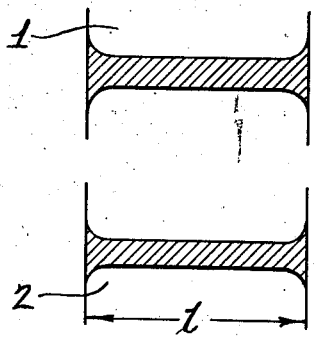
Inventor:
Nils Arvid Palmgren
by his Attorneys
Howson & Howson Patented June 16, 1953

2,642,322

UNITED STATES PATENT OFFICE 2,642,322

ROLLER BEARING

Nils Arvid Palmgren, Goteborg, Sweden, assignor to Aktiebolaget Svenska Kullagerfabriken, Goteborg, Sweden, a corporation of Sweden Application June 30, 1949, Serial No. 102,406
In Sweden July 21, 1948

2 Claims. (Cl. 308—212)

The problem of designing a roller bearing to obtain maximum load carrying capacity has been complicated by the lack of a theoretical basis for the calculation of the stresses in the material which determine the strength of the bearing.

It has however now been found that there is a relation between the load and the life of the bearing to fatigue and that this life varies greatly, depending upon unavoidable variations in the strength of the material from point to point. The result of this condition is, as has now been shown, that the strength of every part of the bearing influences the load carrying capacity and life of the bearing as a whole. The material stresses in every load carrying part of the bearing must therefore be as small as is possible for the load acting upon the bearing during running.

An earlier accepted conception that certain material stresses, e. g. the maximum normal pressure at the contact areas of the rollers, should be the same at both of the roller contacts is consequently incorrect. The material stress, which determines the fatigue, should instead be as small as possible in each of the contacts. As a rule this minimum does not have the same value at both contacts.

The critical material stresses in a roller bearing occur in and adjacent to the contact surfaces between the rollers and the races, and their magnitude depends not only on the load but also upon the shape of the areas of contact.

The present invention relates to a roller bearing in which the rollers and races are so formed that the contact areas will be elliptical for loads less than a certain value, i. e. that there is a certain, even if slight, difference in all directions between the curvatures of the contacting surfaces. The invention is characterized mainly thereby that the major axes of the elliptical contact areas between the roller and the races when the roller is subjected to load have the same length up to a certain limit.

The reason why this arrangement solves the problem of giving bearings of the type referred to a maximum of load carrying capacity is as follows. Since, when the curvature of the contacting surfaces is unchanged, the major axis of the contact ellipse depends solely on a function of the load and the load on the roller from one of the races is always in constant relationship to the load on the roller from the other race, the major axes of the areas of contact of both of the races with the roller will have a constant relationship to each other. If the major axes are equal at one load, they will always be equal independent of the load. Because of the limited length of the roller however, a complete ellipse will be formed only at loads at which the length of the major axis is not greater than the length of the roller. When the load is greater, the contact will assume the form of a truncated ellipse and at a certain greater load, this figure will be transformed into a rectangle or a figure resembling a rectangle. At this limit load, the material stresses will be of the same magnitude at the ends of the roller as at its middle, and the stresses in the contact are the smallest possible for the load in question. In a contact of any other form, but with the same length, the same load would cause greater stresses. If the load is increased above this optimum, the material stresses at the ends of the roller increase at an unproportionate rate and edge pressure arises. This is a well-known phenomenon, which considerably lowers the carrying capacity and life of the bearing.

At the optimal limit mentioned, the length of the major axis of the complete contact ellipse is constant relative to the limited length of the roller, usually in the proportion 1.5 to 1, independent of the combination of principal curvatures in the contact.

In order that the load capacity of the bearing may be as great as possible, it is necessary that the optimum conditions occur at the same time in both contacts, which means that the bearing should be designed with relative curvatures of the rollers and races such that the major axes of the contact ellipses will be of the same length. The curvatures should also preferably be chosen so that the optimal value occurs at the maximum load to which the heaviest loaded roller in the bearing is subjected during use.

The invention is illustrated in the accompanying drawing in which:

Fig. 1 shows a cross section through a double row spherical roller bearing;

Fig. 2 shows the size of the contact ellipses at the outer and inner races respectively for a small load;

Fig. 3 shows the contact ellipses at the optimal load; and

Fig. 4 shows the contact surfaces when the load is increased above this limit.

In Fig. 1 the numeral 1 indicates the outer ring of the bearing, which has a spherical race with the radius $r_2$. The inner ring 2 is provided with two races having concave arcuate generatrices, both with the radius $r_3$. Two rows of rollers 3 and 4 are disposed between the race rings. The rollers have convexly curved generatrices, the curvature of which is $r_1$. Hence, it will be apparent that the concavely curved generatrix of the bearing surface of the outer race 1 exhibits a flatter curvature, i. e. a curvature which more closely approaches a straight line, than the convexly curved generatrices of the bearing surfaces of the rollers 3 and 4, and that the concavely curved generatrix of the bearing surface of the inner race 2 exhibits a flatter curvature than that of the said generatrix of the bearing surface of the outer race 1. The rollers 3 and 4 are separated from one another and are guided by cages 5 and 6, one for each row of rollers. A guide ring 7 is located between the rows of rollers 3 and 4 for assisting in guiding the rollers. The difference in the curvatures of the rollers and the sphere and races, respectively, is somewhat exaggerated in Fig. 1 of the accompanying drawing, in order to make the figure clearer.

The radius $r_1$ of the generatrix of the roller is less than the radius $r_2$ of the spherical surface and this in its turn is somewhat less than the radius $r_3$ of the generatrix of the inner ring race. To state this relationship in other terms, it may be said that the radius of transverse curvature of the roller-engaging surface of the inner race 2 is greater than the radius of transverse curvature of the roller-engaging surface of the outer race 1 and is also greater than the radius of transverse curvature of each of the rollers 3 and 4, i. e. the transverse curvature of the roller-engaging surface of the outer race has a value which lies between that of the roller-engaging surface of the inner race and the transverse curvature of each of the rollers 3 and 4. The major axes of the contact ellipses at the contact between a roller and the respective rings will therefore have the same length. This can be proved mathematically most easily through a calculation which shows that the major axis of the contact ellipse will be too great and consequently edge pressure will occur in the actual contact at the inner race unless the radius of curvature of the generatrix of the inner raceway is greater than the radius of the sphere. An example of a bearing according to the invention is one having a sphere radius of 100 mm., a roller diameter of 25 mm., an effective roller length of 30.4 mm. The load on the heaviest loaded roller is assumed to be 1500 kg. The radius of the generatrix of the roller is assumed to be 99.5 mm. A calculation of the major axis of the contact ellipse according to Hertz theory gives a value of 45.6 mm. for bearing parts of steel. This length is thus one and a half times the effective length of the roller and the material stresses will therefore be the least possible for the load in question.

If the inner raceway is made with a generatrix having a radius of 100 mm. (i. e. equal to the radius of the sphere), the length of the contact at this race would be 46.2 mm., i. e. 1.52 times the effective length of the roller, which means that the edge pressure would be greater than the pressure at the middle of the roller and that this contact would not meet the requirements for minimum stresses. In order to lessen the calculated length of the contact to 1.5 times the effective length of the roller and thus obtain the optimum conditions, the length of the radius of the generatrix of the inner raceway must be increased somewhat so that it will be greater than the radius of the outer spherical raceway.

A check of the calculations of bearings of all current dimensions and proportions gives the same result and the rule is therefore general.

Fig. 2 shows the contact ellipses of a roller with the outer race 1 and inner race 2. The length of the major axis of the ellipse is in both cases $S_1$. Fig. 2 relates to the case in which the load is comparatively small and the length $S_1$ of the ellipse is therefore less than the length (1) of the roller. The contact ellipse at the outer race is wider than the ellipse at the inner race since the concave outer race curves toward the roller while the convex inner race curves away from the roller in the direction of rolling.

Fig. 3 illustrates the optimal condition in which the areas of contact are substantially rectangular and the material stresses are the same at the ends of the roller as at its middle. If the length of the roller were unlimited, an elliptical contact having the length $S_2$ would have been caused under this load. The length $S_2$ would have been greater than the length of the roller in the proportion of 1.5 to 1.

Fig. 4 shows the character of the contact areas when the load exceeds the optimal limit. The contact widens out considerably at the ends of the rollers, since the material stresses at the edges of the roller are abnormally great.

In all of the cases shown, the pressures normal to the surfaces and other stresses in the contact areas are greater at the inner races than at the outer races. For the same number of repeated stresses on the same contact areas, fatigue would therefore probably occur first at the inner race, but, because of the variation of the life, the outer race would also in some cases fail first. Since the outer race contact thus also affects the probable life of the bearing, this contact should be as strong as possible, and since it can be made stronger than the inner race contact, for the reasons given above, this possibility should be taken advantage of in order that the life and load carrying capacity of the bearing may be as great as possible.

The invention is not limited to bearings of the double row self-aligning type as described, but may be applied to all types of roller bearings which have point contacts at both races at low loads.

I claim:

1. A roller bearing having an outer race ring having a concavely curved bearing surface, an inner race ring having a concavely curved bearing surface, and a series of rolling members interposed between said rings and each having a convexly curved bearing surface, the contacting surfaces of the said races and rollers differing from each other in curvature in all planes, the concavely curved generatrix of the bearing surface of the outer race ring exhibiting a flatter curvature than the convexly curved generatrices of the bearing surfaces of said rollers, and the concavely curved generatrix of the bearing surface of the inner race ring exhibiting a flatter curvature than that of the generatrix of the bearing surface of said outer race ring, and the major axes of the areas of contact of an individual of said rollers with the bearing surfaces of the race rings when the bearing is under load being of the same length at both the inner and outer race rings.

2. A roller bearing according to claim 1 wherein said bearing surface of said outer race ring is spherical, wherein said convexly curved bearing surface of each roller is on an arcuate generatrix of less radius than that of said spherical bearing surface on said outer race ring, and wherein said bearing surface on said inner race ring is on an arcuate generatrix, the radius of the arcuate generatrix of said bearing surface on said inner race ring being greater than that of said spherical bearing surface on said outer race ring.

NILS ARVID PALMGREN.

References Cited in the file of this patent

UNITED STATES PATENTS

| Number | Name | Date |
| --- | --- | --- |
| 1,967,650 | Ahmansson | July 24, 1934 |
| 2,008,336 | Palmgren | July 16, 1935 |
| 2,082,390 | Gibbons | June 1, 1937 |
| 2,418,322 | Spicacci | Apr. 1, 1947 |